May 29, 1923.
P. J. BREWINGTON
FLOAT BALL
Filed July 23, 1921
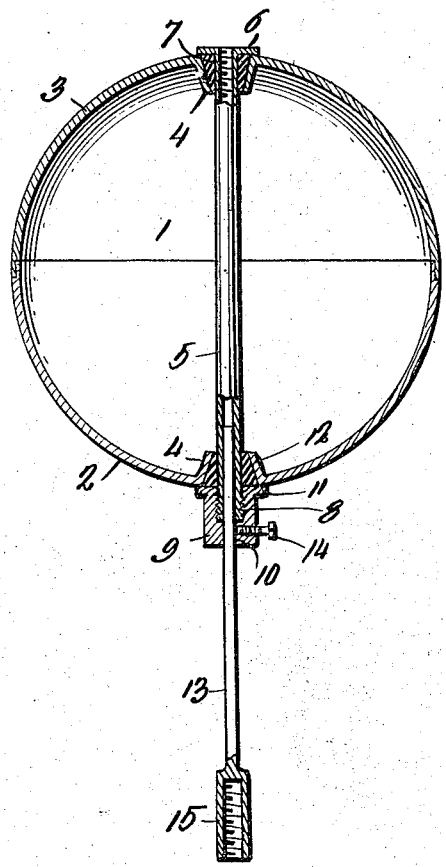
PHILIP J. BREWINGTON INVENTOR.
WITNESSES
BY
ATTORNEY.

Patented May 29, 1923.

1,457,055

UNITED STATES PATENT OFFICE.

PHILIP J. BREWINGTON, OF TEMPLE, TEXAS.

FLOAT BALL.

Application filed July 23, 1921. Serial No. 487,036.

*To all whom it may concern:*

Be it known that I, PHILIP J. BREWINGTON, citizen of the United States, residing at Temple, in the county of Bell and State of Texas, have invented certain new and useful Improvements in Float Balls, of which the following is a specification.

This invention relates to new and useful improvements in float balls and more particularly to the means for connecting the same to a valve stem, the primary object of the invention being to provide a float ball which may be adjusted relative to the valve for varying the leverage or length of the float stem and incidentally rendering the float ball adaptable for use in tanks of various sizes.

Another object of the invention is to connect the float stem with the ball in a manner to render the latter water tight and also provide means for connecting the halves of the float ball together.

A further object of the invention is to provide a device of the above nature which may be easily taken apart for repairs or transportation and one which is strong, durable, inexpensive to manufacture and highly efficient in practice.

Other objects and advantages of the invention will become apparent during the course of the following description.

In the drawing forming a part of the application the figure represents a longitudinal section through the invention.

In the drawing wherein for the purpose of illustration is shown the preferred embodiment of my invention, the numeral 1 designates the float ball which may be constructed from metal, glass or any other suitable material and is made in two halves 2 and 3, which may be pressed together by the standard method or united as shown in the drawing or it may be made in one piece. The ball at diametrically opposite points is provided with openings each having an inwardly extending conical flange 4 surrounding the same as clearly illustrated and when the ball is made up of two halves as shown, the openings and flanges are arranged at the end of a line arranged at right angles to the meeting ends of the halves 2 and 3.

A tubular rod 5 extends through the openings in the float ball and one end of the tube is provided with an outwardly extending flange 6 which abuts the outer end of a conical rubber gasket 7 positioned upon the tube to force the gasket into the opening in the half 3 of the ball and into snug engagement with the flange 4. This end of the tube is also provided with internal screw threads as clearly seen for the purpose which will hereinafter appear.

The opposite end of the tube 5 is provided with external screw threads 8 to receive a jam nut 9 which is provided with a bore 10 communicating with the threaded recess therein. The abutting end of the nut 9 is equipped with an outstanding flange 11 adapted for engagement with the enlarged end of a conical gasket 12 adapted to be received in the opening in the half 2 of the ball.

In order that the ball may be adjustable along its stem 13, the stem is inserted through the bore 10 in the nut and into the end of the tube 5 provided with the threads 8. In order to maintain the float ball in adjusted position along the stem, a set screw 14 is carried by the nut and adapted to engage the stem. The outer end of the stem 13 is enlarged and provided with a threaded socket 15 adapted for reception of the valve stem or end of a valve operating lever not shown. However, it will be obvious that the connection of the stem 13 with the stem of the valve or other connections with the valve may be made in numerous other ways.

When the various parts of the device are assembled and the nut 9 threaded upon the threads 8 of the tube, it will be obvious that the conical gasket 7 and 12 will be forced inwardly of the ball and into binding engagement with the conical flanges 4 whereby a water tight connection between the tube and the ball will be effected as well as a water tight connection between the halves of the float ball, provided two halves are used in the formation of the ball. When it is desired to increase the leverage or length of the portion of the stem 13 exterior of the ball, the set screw 14 is loosened so as to permit the ball to be moved outwardly upon the stem 13, after which the thumb screw 14 is tightened to fasten the ball in place. To decrease the leverage or length of the float stem, the same operations are carried out, and the ball moved toward the socket 15. In the event of it being undesirable to use the stem 13, it may be entirely detached from the float ball and the valve stem threaded into the end of the tube 5 having the flange 6 thereon.

The foregoing description and accompanying drawings have reference to what might be considered to be the approved or preferred form of my invention. I desire to be understood that I may make such changes in the construction, combination, and arrangement of parts, material, dimension, etc. as may prove expedient and fall within the scope of the appended claims.

Having thus described my invention what I claim as new and desire to secure by Letters Patent, is:

1. A float ball having a tube associated therewith, one end of the tube being screw threaded, a stem adjustably mounted in said tube, a nut threaded upon the threaded end of said tube, and means for retaining said nut in adjusted position upon the stem.

2. A float ball having a tube associated therewith, one end of the tube being internally screw threaded and the opposite end of the tube being exteriorly threaded, said interiorly threaded end being adapted to receive a valve stem, a float stem adjustably mounted in the opposite end of said tube, a nut threaded upon the exterior threads of the tube, and means for retaining the nut in adjusted fixed relation to said float stem.

3. A float ball having a pair of diametrically disposed openings therein surrounded by inwardly tapered flanges, a conical gasket received in each of said openings, a tube extending through the float ball and gaskets, one end of said tube being flanged to abut the adjacent gasket, the other end of the tube being threaded, a rod adjustably mounted in said threaded end of the tube, a nut mounted on said threaded end and adapted to abut the gasket arranged adjacent thereto, and means for retaining said nut in adjusted fixed relation to said rod.

In testimony whereof I affix my signature in presence of two witnesses.

PHILIP J. BREWINGTON.

Witnesses:
Y. Q. BAKER,
G. H. JOHNSON.